US008707817B2

(12) United States Patent
Itazu et al.

(10) Patent No.: US 8,707,817 B2
(45) Date of Patent: Apr. 29, 2014

(54) STATE-CHANGING ELEMENT OPERATING DEVICE, RANGE CHANGING DEVICE FOR AUTOMATIC TRANSMISSION, AND PARKING APPARATUS

(75) Inventors: Naoki Itazu, Nagoya (JP); Yoshinobu Nozaki, Anjo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 826 days.

(21) Appl. No.: 12/676,303

(22) PCT Filed: Aug. 28, 2008

(86) PCT No.: PCT/JP2008/065389
§ 371 (c)(1),
(2), (4) Date: Mar. 3, 2010

(87) PCT Pub. No.: WO2009/031449
PCT Pub. Date: Mar. 12, 2009

(65) Prior Publication Data
US 2010/0294066 A1    Nov. 25, 2010

(30) Foreign Application Priority Data
Sep. 4, 2007  (JP) ................................. 2007-229542

(51) Int. Cl.
*B60K 17/04*   (2006.01)
*G05G 5/00*    (2006.01)

(52) U.S. Cl.
USPC ................... 74/473.12; 74/473.21; 74/473.22

(58) Field of Classification Search
USPC ................. 74/473.1, 473.11, 473.12, 473.21, 74/473.24, 473.25, 473.3, 473.31, 473.36
See application file for complete search history.

(56) References Cited

U.S. PATENT DOCUMENTS

| 2005/0146302 A1 | 7/2005 | Kamio et al. |
| 2006/0103339 A1 | 5/2006 | Yamada et al. |
| 2006/0261760 A1 | 11/2006 | Shinojima et al. |
| 2007/0044583 A1 * | 3/2007 | Hori et al. ........................ 74/335 |

FOREIGN PATENT DOCUMENTS

| JP | 2005-180653 A | 7/2005 |
| JP | 2006-136035 A | 5/2006 |
| JP | 2006-322553 A | 11/2006 |
| JP | 2006-336680 A | 12/2006 |

* cited by examiner

*Primary Examiner* — Justin Krause
*Assistant Examiner* — Gregory Prather
(74) *Attorney, Agent, or Firm* — Sughrue Mion, PLLC

(57) ABSTRACT

An operating device (40) for a state-changing element that is an embodiment of the present invention includes a detent mechanism (50) for displacing and positioning displacement members (22, 33) included in a state-changing element (10), an actuator (60) for driving the detent mechanism (50), and a control unit (5) that controls the actuator (60). The control unit (5) includes an initial motion means (S1) that, in a case of receiving a request to change the state of the state-changing element (10) and changing the position of a detent member (51), drives an electric motor (61) and reduces play in the rotation direction that exists in the actuator (60), and a management means (S2 to S5) that, when it has been determined that the play has been reduced, sets a value obtained by tacking on play in the rotation direction that exists in a coupling portion between a spindle (52) and an output shaft (63) to a rotation angle necessary for a position change of the detent member (51) corresponding to the request, as a target rotation angle of the electric motor (61).

6 Claims, 11 Drawing Sheets

STATE-CHANGING ELEMENT OPERATING DEVICE, RANGE CHANGING DEVICE FOR AUTOMATIC TRANSMISSION, AND PARKING APPARATUS

TECHNICAL FIELD

The present invention relates to an operating device for operating a state-changing element whose state changes by being mechanically displaced.

Note that examples of a state-changing element include a range changing device for an automatic transmission mounted in a vehicle such as an automobile, and a parking apparatus disposed in a transmission for a vehicle. In other words, a range changing device, a parking apparatus, and the like are targets for use of the operating device according to the present invention.

BACKGROUND ART

In general, automatic transmissions for vehicles are configured such that a shift range selected from among a parking range (P), a reverse range (R), a neutral range (N), a drive range (D), and the like is established due to a driver operating, for example, a shift lever disposed in the vicinity of the driver seat of a vehicle.

In general, range changing devices of recent years have been called by-wire systems, and when the driver operates the shift lever, a sensor or the like detects the range position selected by the shift lever, and based on this detection signal, the operating device described below changes the state of a parking mechanism and a manual valve, which is one constituent element of a hydraulic control device for shift range changing (e.g., see Patent Literature 1).

Here, the operating device includes a detent mechanism for positioning a spool of the manual value and a parking rod of the parking mechanism by pushing/pulling them in stages, an actuator for driving the detent mechanism, and an electronic control unit that controls the actuator.

The detent mechanism includes a detent plate that pushes/pulls the spool and the parking rod by being tilted by the actuator, and a detent spring that maintains the resting position of the detent plate.

A spindle that is coupled to an output shaft of the actuator is integrally attached to the detent plate at the center of tilt thereof, and the detent plate is provided with a wave part formed from a plurality of valleys that correspond to each rotation angle of the detent plate and mountains between the valleys.

A roller is provided on the free end side of the detent spring, as an engaging part that engages with any of the valleys of the wave part. Upon engaging the roller with a valley, the detent spring exerts elastic force on the detent plate so as to keep the engaged state.

The actuator includes an electric motor or the like, and a deceleration mechanism that decelerates the output of the electric motor, and transfers such output to the output shaft. In general, such an actuator has play (backlash, assembly error, or the like) in the rotation direction between the rotor of the electric motor and the output shaft.

Here, for reference, if the parking range P has been selected by the shift lever, the detent plate is tilted by a predetermined angle, and in conjunction with this tilting of the detent plate, the parking rod of the parking apparatus is, for example, pushed to the back, thus putting the output shaft of the automatic transmission in a locked state in which rotation is not possible.

Also, if the reverse range R, the neutral range N, or the drive range D has been selected, the detent plate is tilted by a predetermined angle, and in conjunction with this tilting of the detent plate, the parking rod is, for example, pulled forward, thus putting the output shaft of the automatic transmission in an unlocked state in which rotation is possible, and also, the spool of the manual value is displaced in the axial direction, thus engaging or freeing a frictional engaging element such as a clutch or a brake that is included in a transmission mechanism part of the automatic transmission, thereby establishing the requested range.

Incidentally, in any of the above situations, when the detent plate is at rest, the roller of the detent spring is engaged with any of the valleys of the wave part of the detent plate, thus positioning and maintaining the position of the detent plate.

CITATION LIST

Patent Literature

[PTL 1]
JP 2006-322553A

SUMMARY OF INVENTION

Technical Problem

In general, in the above-described range changing device, play (backlash) exists in the rotation direction within the actuator, and therefore at the time of changing the position of the detent plate, there is a difference between the target rotation angle of the electric motor of the actuator and the actual rotation angle of the detent plate.

In view of this, it is possible to simply set the target rotation angle of the actuator with consideration given to a standard value of the internal play that has been uniquely determined by experimentation or the like, but since there are individual differences in the internal play for each operating device, it can be said that it has not been possible to precisely perform control for changing the position of the detent plate.

To address this, Patent Literature 1 discloses actually detecting the internal play of the actuator, and with consideration given to this detected internal play, setting the target rotation angle of the actuator for when changing the position of the detent plate. In this case, it is thought that it is possible to precisely perform control for changing the position of the detent plate since consideration is given to individual differences in internal play.

However, in a case such as using spline fitting as the coupling between the output shaft of the actuator and the spindle of the detent plate, it is necessary for the total play in the power transmission pathway from the actuator to the detent member to be obtained by adding the backlash (coupling play) existing in the coupling part to the above-described internal play of the actuator. In this case, this is addressed in the above-described Patent Literature 1 by an embodiment in which play is detected with use of a difference between the output of a rotor angle detection means and the output of an output angle detection means, and therefore it is thought that substantially the internal play of the actuator is detected, and the coupling play is not detected. It can be said that there is room for improvement with respect to this.

An object of the present invention is to enable precisely performing detent plate position changing in an operating device for a state-changing element such as a shift changing mechanism and a parking mechanism that are included in a vehicle.

Also, an object of the present invention is to provide a range changing device that includes the above-described operating device. Furthermore, an object of the present invention is to provide a parking apparatus that includes the above-described operating device.

Solution to Problem

An operating device for a state-changing element according to the present invention is an operating device for a state-changing element whose state changes by being mechanically displaced, the operating device including a detent mechanism for displacing and positioning a displacement member included in the state-changing element, an actuator for driving the detent mechanism, and a control unit that controls the actuator, the detent mechanism including a detent member that displaces the displacement member by being tilted by the actuator, and a positioning member that maintains a resting position of the detent member, the actuator including an electric motor that generates rotational power, and a deceleration mechanism that decelerates the rotational power generated by the electric motor, and outputs the decelerated rotational power from an output shaft that is coupled coaxially with a spindle of the detent member and so as to be capable of integral rotation, and the control unit including an initial motion means that, in a case of receiving a request to change the state of the state-changing element and changing the position of the detent member, reduces play in the rotation direction that exists in a coupling portion between the spindle and the output shaft from after driving of the electric motor until the output shaft rotates, and a management means that, when it has been determined that the play has been reduced, sets a value obtained by tacking on play in the rotation direction to a spindle rotation angle necessary for a position change of the detent member corresponding to the request, as a target rotation angle of the electric motor.

In the first place, in an operating device employing a detent mechanism, for example, play in the rotation direction exists from after driving of the electric motor until the output shaft rotates, and play exists in the rotation direction in the coupling portion between the spindle and the output shaft, and therefore there are cases in which the target rotation angle of the electric motor of the actuator and the actual rotation angle of the detent member are different due to the accumulation of such play.

In view of this, in the present invention, basically, at the time of changing the position of the detent member, first the play in the rotation direction from after driving of the electric motor until the output shaft rotates is reduced, thus enabling drive force to be directly transmitted from the rotor of the electric motor to the output shaft, and thereafter consideration is given to the play of the coupling portion with respect to the subsequent target rotation angle of the electric motor, thus rotationally driving the detent member in a state in which the coupling play has been reduced.

Accordingly, the position of the detent member can be precisely changed to the target position in the state in which all of the play that exists in the power transmission pathway from the electric motor to the detent member has been absorbed.

With the present invention, troublesome control such as actually detecting play in the actuator and setting the target rotation angle with consideration given to this play such as in the conventional example is not performed, thereby enabling the simplification of control content, and along with this, suppressing or preventing an elevation in the cost of designing control programs and the like.

Furthermore, the present invention is an operating device for a state-changing element whose state changes by being mechanically displaced, the operating device including a detent mechanism for displacing and positioning a displacement member included in the state-changing element, an actuator for driving the detent mechanism, and a control unit that controls the actuator, the detent mechanism including a detent member that displaces the displacement member by being tilted by the actuator, and a positioning member that maintains a resting position of the detent member, the actuator including an electric motor that generates rotational power, and a deceleration mechanism that decelerates the rotational power generated by the electric motor, and outputs the decelerated rotational power from an output shaft that is coupled coaxially with a spindle of the detent member and so as to be capable of integral rotation, and the control unit including an initial motion means that, in a case of receiving a request to change the state of the state-changing element and changing the position of the detent member, reduces a total of play in the rotation direction from after driving of the electric motor until the output shaft rotates and play in the rotation direction in a coupling part from the output shaft to the detent member, and a management means that, when it has been determined that the total of the play has been reduced according to detection of the start of rotation of the spindle or the detent member by a detent angle detection means that detects a rotation angle of the spindle or the detent member, sets a spindle rotation angle necessary for a position change of the detent member corresponding to the request, as a target rotation angle, and drives the electric motor.

In this case, basically, at the time of changing the position of the detent member, first the total of play in the rotation direction from after driving of the electric motor until the output shaft rotates and play in the rotation direction in the coupling part from the output shaft to the detent member is accumulated and reduced, thereby enabling drive power to be directly transmitted from the electric motor to the detent member, and by driving the electric motor by only the spindle rotation angle necessary for changing the position of the detent member from this state, the rotor of the electric motor and the spindle of the detent member are caused to rotate integrally.

Accordingly, the position of the detent member can be precisely changed to the target position in the state in which the total of play in the rotation direction from after driving of the electric motor until the output shaft rotates and play in the rotation direction in the coupling part from the output shaft to the detent member has been absorbed.

Moreover, with the present invention, troublesome control such as actually detecting internal play in the actuator and setting the target rotation angle with consideration given to this internal play such as in the conventional example is not performed, thereby enabling the simplification of control content, and along with this, suppressing or preventing an elevation in the cost of designing control programs and the like.

Preferably, the management means determines, based on output from a rotor angle detection means that detects a rotation angle of a rotor of the electric motor, whether the detected rotation angle of the rotor has reached the target rotation angle, and stops the driving of the electric motor when it has been determined that the target rotation angle has been reached.

In this case, since drive control of the electric motor is performed based on detection output from the rotor angle detection means, it is possible to make the control content simpler than the case in which detection output from the rotor angle detection means and the output angle detection means are used, as in the conventional example.

Preferably, the detent member has a wave part formed from a plurality of valleys that correspond to each rotation angle of the detent member and a mountain between the valleys, the positioning member has an engaging part that is engaged with any of the valleys of the wave part on a free end side of the positioning member, and furthermore a spindle rotation angle necessary for a position change of the detent member is an angle from the bottom of a valley to the bottom of another valley of the detent member.

In this case, an exemplary configuration of the detent member and the positioning member is specified, and such specification clarifies that the detent member position changing is performed in stages according to the number of valleys. Also, a spindle rotation angle necessary for detent member position changing is defined, thus clarifying the content of when the target rotation angle of the electric motor is set.

Note that the above-described state-changing element can be, for example, the range changing device for an automatic transmission, or a parking apparatus.

A range changing device for an automatic transmission according to the present invention includes: a shift operation means for selecting a shift range by being humanly operated; a range detection means that detects a position of a shift range that has been selected by the shift operation means; and an operating device for changing the state of a manual valve that is a constituent element of a hydraulic control device for shift range changing included in the automatic transmission, based on detection output from the range detection means, the operating device having the above-described configuration.

In this case, since the operating device of the range changing device has the above-described configuration, it is possible to, for example, precisely change the state of the manual valve, and improve operation stability.

A parking apparatus according to the present invention includes: a parking gear externally fixed to an output shaft of a transmission; a parking lock pole that has a claw able to be locked to the parking gear, and furthermore is displaced to a lock position at which rotation is made impossible by approaching the parking gear and causing the claw to be locked with the parking gear, and an unlock position at which rotation is made possible by separating from the parking gear and detaching the claw from the parking gear; a parking rod that is pushed/pulled so that the parking lock pole is displaced closer or farther with respect to the parking gear; and an operating device for pushing/pulling the parking rod, the operating device have the above-described configuration.

In this case, since the operating device of the parking apparatus has the above-described configuration, it is possible to, for example, precisely change the state of the parking gear, and improve operation stability.

Advantageous Effects of Invention

According to the operating device for the state-changing element according to the present invention, it is possible to, for example, position a detent member by precisely changing it to a target position with a relatively simple technique, and contribute to an improvement in operation stability.

Since the operating device included in the range changing device for the automatic transmission according to the present invention has the above-described configuration, it is possible to precisely change the state of the manual valve.

Since the operating device included in the parking apparatus according to the present invention has the above-described configuration, it is possible to precisely change the state of the parking gear.

DESCRIPTION OF EMBODIMENTS

Figure 1:
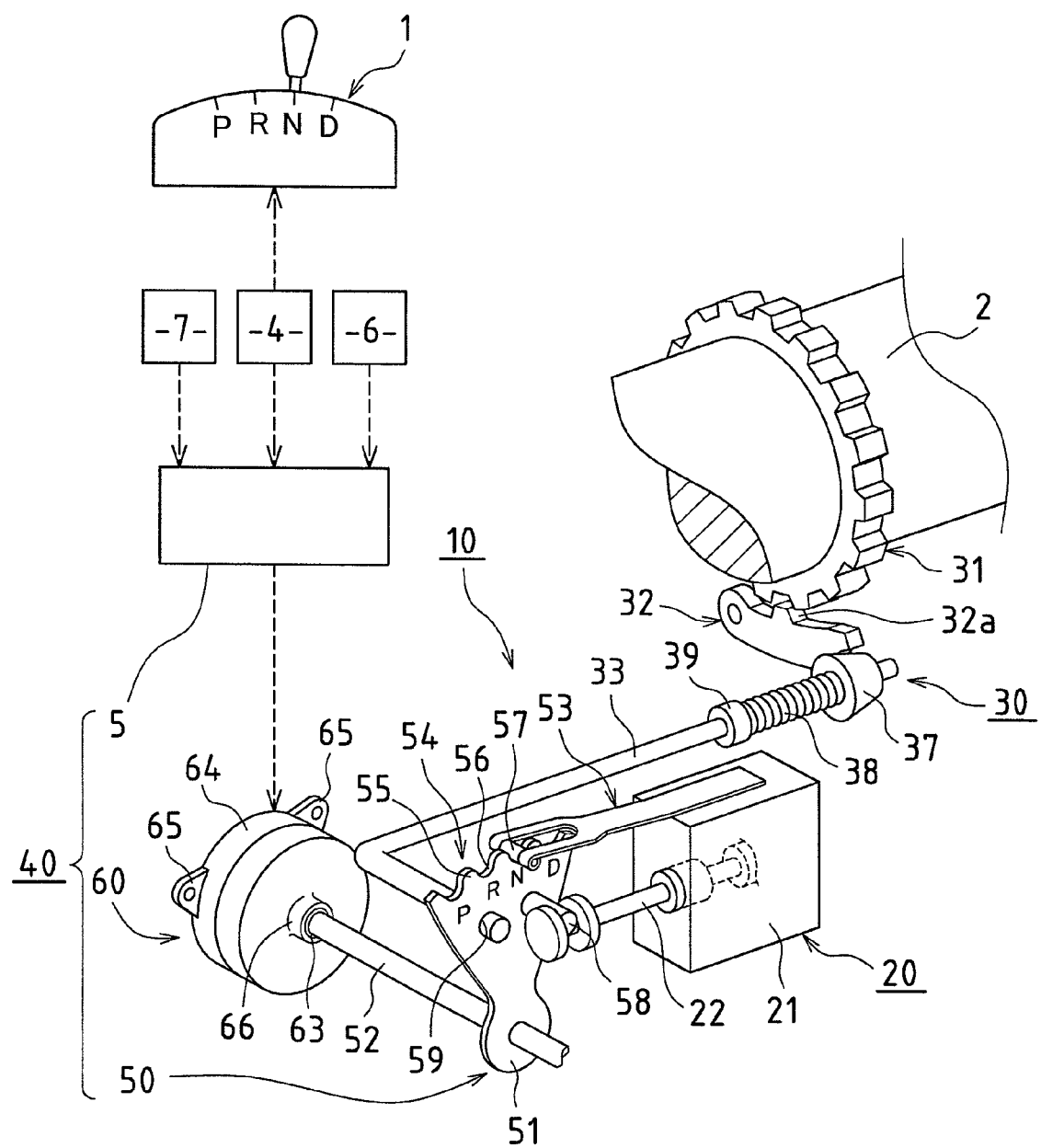
FIG. 1 is a perspective view showing a schematic configuration of an embodiment of a range changing device according to the present invention.

Below is a detailed description of embodiments of the present invention with references to FIGS. 1 to 12.

Firstly, FIGS. 1 to 8 show an embodiment of a range changing device for an automatic transmission that is a target for use of an operating device according to the present invention. Before describing portions to which features of the present invention have been applied, the following describes a schematic configuration of the range changing device with reference to FIGS. 1 to 3.

In an automatic transmission mounted in a vehicle such as an automobile, a parking range P, a reverse range R, a neutral range N, a drive range D, and the like are established according to a shift range that has been selected by, for example, a shift lever 1 as a shift operation means disposed in the vicinity of a vehicle driver seat.

A range changing device 10 of this embodiment is a so-called by-wire system, and has a configuration mainly including a manual valve 20 for range changing in the automatic transmission, a parking apparatus 30, and an operating device 40.

The manual valve 20 is one of the constituent elements of a hydraulic control device that controls engaging operations of various types of brakes and clutches included in a transmission mechanism part of the automatic transmission that is not shown.

Note that although it is generally known, besides the manual valve 20, the hydraulic control device includes a plurality of linear solenoid valves that control engaging operations of the various types of brakes and clutches, and when the shift lever 1 has been operated, the manual valve 20 is operated and a hydraulic oil supply pathway with respect to the linear solenoid valves is changed, thus establishing a range corresponding to the operation.

The manual valve 20 is in a form called a spool valve, which is generally known, and has a configuration mainly including a valve body 21 and a spool 22.

The valve body 21 is fixed at an appropriate place in the automatic transmission case, and has an appropriate feeding port and discharge port. The spool 22 is stored in the valve body 21 so as to be able to be displaced in the axial direction.

The parking apparatus 30 changes an output shaft 2 of the automatic transmission to a locked state in which rotation is not possible or an unlocked state in which rotation is possible, and has a configuration mainly including a parking gear 31, a parking lock pole 32, and a parking rod 33.

The parking gear 31 is externally fixed to the output shaft 2 of the automatic transmission so as to be capable of integral rotation.

The parking lock pole 32 is disposed in the vicinity of the parking gear 31 so as to be freely tiltable with the fulcrum at one end side. A claw 32a that can be inserted in or removed from between teeth of the parking gear 31 is provided partway in the lengthwise direction of the parking lock pole 32. Note that the parking lock pole 32 is constantly biased in a direction of being pulled away from the parking gear 31, by a spring that has been omitted from the drawings.

The parking rod 33 is disposed so as to be displaced forwards or backwards substantially parallel with the output shaft 2 of the automatic transmission.

As shown in FIG. 1, the front end of the parking rod 33 is coupled with a detent plate 51 of the operating device 40 described below, and is pushed/pulled by a tilting operation of this detent plate 51.

Also, a taper cone 37 for tilting the parking lock pole 32 is provided at the rear end of the parking rod 33. The taper cone 37 is pushed to the parking gear 31 side by a coil spring 38. The coil spring 38 is provided on the exterior of the parking rod 33, and one end is retained by a retaining ring 39 that is fixed and locked to the parking rod 33.

The operating device 40 operates the manual valve 20 and the parking apparatus 30 in order to establish the shift range (P, R, N, D) selected by the shift lever 1, and has a configuration mainly including a detent mechanism 50, an actuator 60, and an ECU (Electronic Control Unit) 5.

The detent mechanism 50 positions the spool 22 of the manual valve 20 and the parking rod 33 of the parking apparatus 30 by pushing/pulling them in stages. The actuator 60 drives the detent mechanism 50. The ECU 5 controls the actuator 60.

The detent mechanism 50 has a configuration including the detent plate 51, a spindle 52, and a detent spring 53.

The detent plate 51 pushes/pulls the spool 22 of the manual valve 20 and the parking rod 33 of the parking apparatus 30 by being tilted by the actuator 60.

The outer configuration of the detent plate 51 has been formed into a fan shape, and in an area that is the center of tilt thereof, the spindle 52 that is separate from the detent plate 51 is fixed in a state of penetrating the detent plate 51 and so as to be capable of integral rotation.

Specifically, the coupling between the detent plate 51 and the spindle 52 is a form in which, for example, a cylindrical boss part (e.g., see FIG. 3) is provided at a tilt fulcrum portion of the detent plate 51, the spindle 52 is fitted into the borehole of this cylindrical boss part, and a spring pin or the like (omitted from the drawings) is driven in, but another form is also possible.

Accordingly, when the spindle 52 is rotated, the detent plate 51 rotates (or tilts) integrally with this. Note that the detent plate 51 and the spindle 52 may be formed integrally.

An output shaft 63 of the actuator 60 is coupled to one axial direction end of the spindle 52 coaxially and so as to be capable of integral rotation, and although not shown, the other axial direction end of the spindle 52 is rotatably supported by an automatic transmission case 3 or the like.

This coupling between the spindle 52 of the detent plate 51 and the output shaft 63 of the actuator 60 is, for example, spline fitting. Specifically, male splines (not indicated by reference numerals) are provided on the outer circumference on one end side of the spindle 52, and female splines (not indicated by reference numerals) are provided on the inner circumferential face of a horizontal hole portion on the inner diameter side of the output shaft 63 of the actuator 60. Accordingly, when the spindle 52 is rotationally driven by the actuator 60 by a predetermined angle in a forward or reverse direction, the detent plate 51 is tilted.

Also, the front end of the spool 22 of the manual valve 20 is coupled to a predetermined position on the detent plate 51, and the front end of the parking rod 33 of the parking apparatus 30 is coupled to a predetermined position on the detent plate 51. Accordingly, when the detent plate 51 is tilted, the spool 22 of the manual valve 20 is caused to be displaced in the axial direction, and the parking rod 33 is caused to become displaced in the axial direction.

Note that as for the form of coupling of the spool 22 to the detent plate 51, a pin 58 attached to a predetermined position on the detent plate 51 parallel with the spindle 52 is mounted between two disks provided on an outer end portion of the spool 22.

Also, as for the form of coupling of the parking rod 33 to the detent plate 51, a curved tip part of the parking rod 33 is inserted into a through-hole 59 provided in the detent plate 51 on one end side in the lengthwise direction, and then a snap ring, retaining pin, or the like that has been omitted from the drawings is attached to the curved tip part, or the curved tip part is retained and fixed by causing the curved tip part to undergo plastic deformation.

The detent plate 51 is tilted in, for example, four stages corresponding to shift ranges (e.g., the parking range P, the reverse range R, the neutral range N, and the drive range D) that are selected by the shift lever 1, and causes the spool 22 of the manual valve 20 to be displaced in four stages in the axial direction, according to the tilted position of the detent plate 51.

In order to achieve this, a wave part 54 is provided on the top end side of the detent plate 51. Reference numeral 55 denotes a mountain portion of the wave part 54, and reference numeral 56 denotes a valley portion thereof. The shape of the valleys 56 of the wave part 54 in this embodiment is bilaterally symmetrical, with the bottom as the center, as with a sine curve, but this shape is arbitrary.

Figure 2:
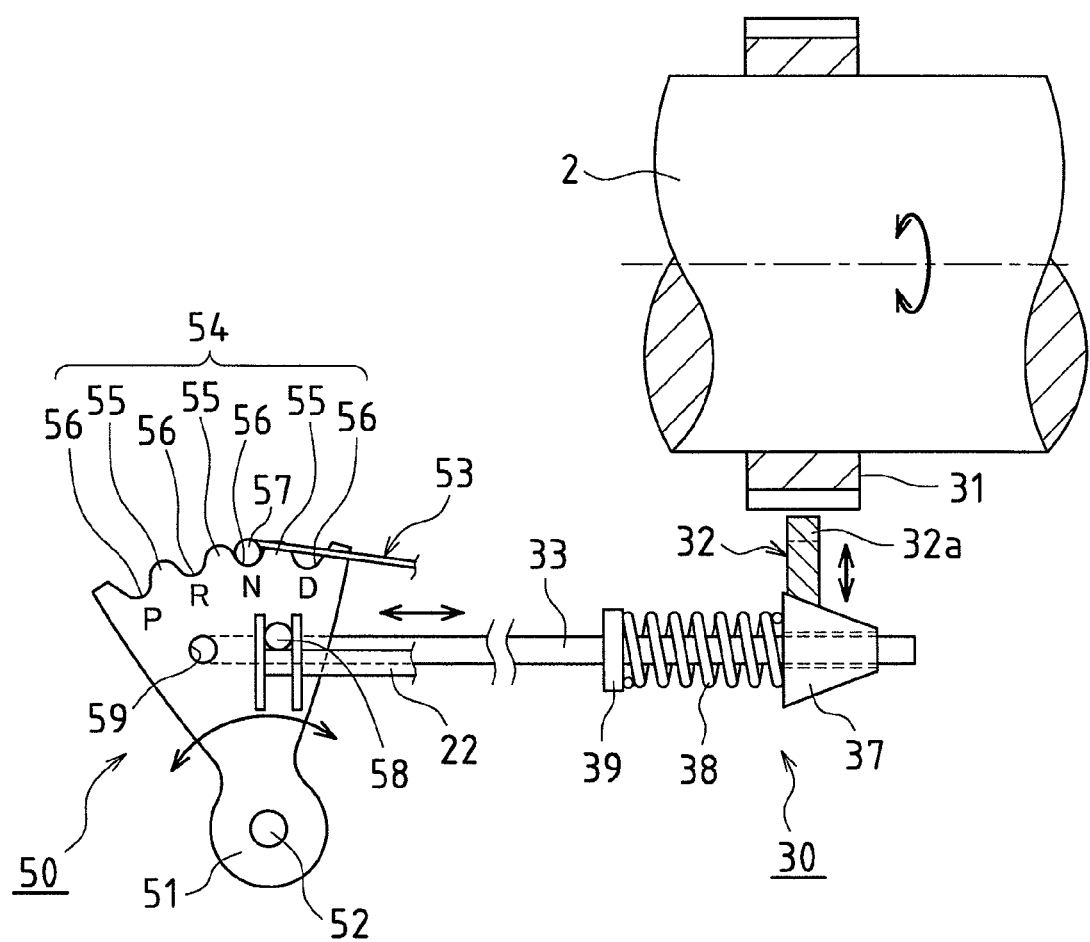
FIG. 2 is a side view of the range changing device in FIG. 1, and shows a neutral range N.

The number of valleys 56 (four) that the wave part 54 has corresponds to the four stages of shift ranges (the parking range P, the reverse range R, the neutral range N, and the drive range D) of the shift lever 1. Also, as shown in FIG. 2, the marks "P, R, N, D" are marked on the detent plate 51 in the vicinity of the four valleys 56.

The detent spring 53 individually positions the four stages of tilted positions of the detent plate 51 and maintains such positions, and therefore is formed from a belt-shaped plate spring that is flexible, and has a configuration in which a two-pronged portion at the tip thereof rotatably supports a roller 57.

Note that although not shown in detail, the roller 57 has a hollow shape, a spindle is inserted in the center hole thereof, and the two ends of this spindle in the axial direction are fixed to the two-pronged portion of the detent spring 53.

One end side of the detent spring 53 is fixed to, for example, the valve body 21 of the manual valve 20 in this embodiment. Also, the roller 57 is engaged with any of the valleys 56 in the wave part 54 of the detent plate 51, and is disposed such that, in such state, the detent spring 53 is itself somewhat elastically deformed and in a warped position, thus acting so as to press the roller 57 onto the bottom of the valley 56 due to the elastic restoring force of the detent spring 53, thereby reinforcing the engaged state.

However, the detent spring 53 can be disposed such that in the state in which the roller 57 of the detent spring 53 is engaged with the valley 56, the detent spring 53 itself is in a substantially straight natural position.

Figure 3:
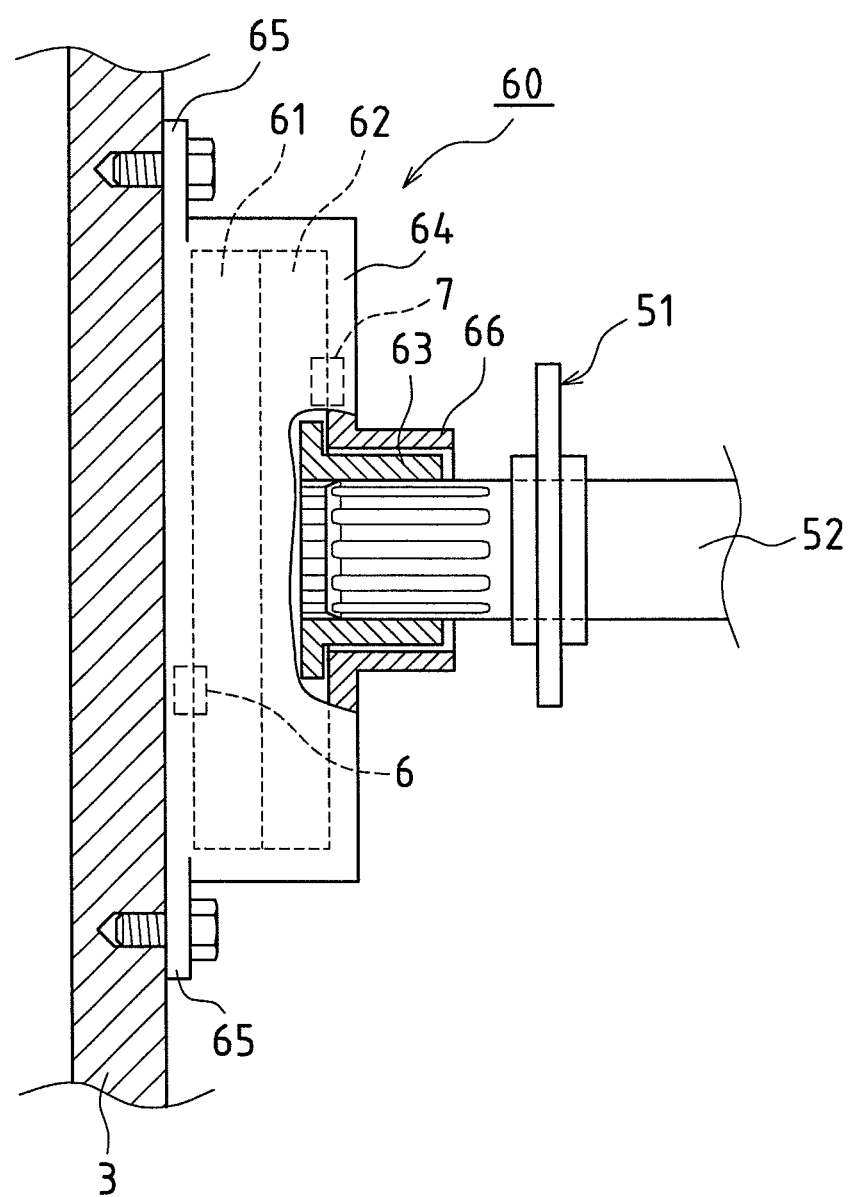
FIG. 3 is a side view showing a cross section of a coupling portion between an output shaft of an actuator and a spindle of a detent plate in FIG. 1.

Although not shown in detail, as shown in FIG. 3 for example, the actuator 60 has a configuration in which an electric motor 61 as a rotative power generation part, a deceleration mechanism 62, and an output shaft 63 are stored in a case 64.

Attachment pieces 65 are provided at several circumferential places on the outer diameter side of the case 64, and the actuator 60 is attached by fixing such attachment pieces 65 to the automatic transmission case 3 (shown only in FIG. 3) with use of bolts.

Although not shown in detail, the deceleration mechanism 62 is any of, for example, a mechanism using a cycloid gear, a gear mechanism in which a plurality of gears are combined, and a planetary gear mechanism. An input member (omitted from the drawings) of this deceleration mechanism 62 is coupled to the rotor (omitted from the drawings) of the electric motor 61, and the output shaft 63 is provided integrally with an output member (omitted from the drawings) of the deceleration mechanism 62.

A tube-shaped boss part 66 for exposing the end part of the output shaft 63 to the exterior is provided in a predetermined area of the case 64. The output shaft 63 is out of contact with the tube-shaped boss part 66, and is freely rotatable. The output shaft 63 is exposed to the exterior from the opening of the tube-shaped boss part 66.

As shown in FIG. 3, a rotor angle detection means 6 for detecting the rotation angle of the rotor of the electric motor 61, and an output angle detection means 7 for detecting the rotation angle of the output shaft 63 are provided in the case 64.

Note that the rotor angle detection means 6 and the output angle detection means 7 have conventionally known configurations (e.g., see Patent Literature 1), and therefore detailed drawings and a detailed description have been omitted, and such means will be described briefly.

The rotor angle detection means 6 is configured by magnets disposed on the outer circumference of the rotor, or magnetic poles magnetized so as to have alternating opposite polarities on the outer circumference of the rotor, and a Hall IC for magnetism detection, and is, for example, a digital encoder that outputs a number of pulses according to the rotation amount of the rotor.

The output angle detection means 7 is configured by magnets that are disposed in a predetermined rotation angle range on the outer face side of the output shaft 63, and whose cross-sectional area gradually increases toward one direction in the circumferential direction, and a linear output Hall IC, and is an analog magnetism sensor that detects the magnetic force of the magnets according to the rotation angle of the output shaft 63, and outputs linear analog signals according to the detected magnetic force. These detection means 6 and 7 can have an appropriate configuration other than the above-described configurations.

Next is a detailed description of operations of the range changing device 10 having such a configuration.

In normal transmission processing, when any of the parking range (P), the reverse range (R), the neutral range (N), the drive range (D), or the like of the automatic transmission has been selected by the driver manually operating the shift lever 1, the range position sensor 4 detects which of the range positions has been selected.

The ECU 5 recognizes the selected range position based on detection output from the range position sensor 4, and the ECU 5 drives the output shaft 63 of the actuator 60 so as to rotate in a forward direction or in a reverse direction, and appropriately rotates (tilts) the spindle 52 and the detent plate 51.

At this time, the detent spring 53 once elastically deforms due to passing over a mountain 55 of the wave part 54 of the detent plate 51, the roller 57 engages with the next valley 56 in the wave part 54, and the detent plate 51 is positioned and maintained by the detent spring 53.

Due to the tilting of the detent plate 51, the spool 22 of the manual valve 20 slides in the axial direction, and the manual valve 20 changes to the selected range position among "P", "R", "N", and "D". Accordingly, the hydraulic control device that is not shown is appropriately driven, and an appropriate transmission stage in the automatic transmission is established.

Note that if the parking range P has been selected, the manual valve 20 is switched to the "P" position, the parking rod 33 of the parking apparatus 30 is caused to slide in the axial direction, and the claw 32a of the parking lock pole 32 is caused to engage with the parking gear 31. Accordingly, the output shaft 2 of the automatic transmission is put into the locked state in which rotation is not possible.

Also, if another range is selected after being in the parking range P position, the ECU 5 drives the actuator 60, thus rotating the spindle 52 by a target angle in the inverse rotation direction, the detent plate 51 is thereby tilted in the same direction as the previously described direction, along with this, the parking rod 33 and the taper cone 37 are caused to slide axially in the opposite direction from the previously described direction, and the upward pushing force of the parking lock pole 32 generated by the taper cone 37 is canceled.

Accordingly, the parking lock pole 32 descends downward, and the claw 32a becomes free from between the teeth of the parking gear 31, and therefore the output shaft 2 is put into the unlocked state in which rotation is possible. At the same time, the spool 22 of the manual valve 20 is displaced to a target position, thus creating an appropriate hydraulic oil supply pathway in the hydraulic control device.

The following is a detailed description of portions to which features of the present invention have been applied with reference to FIGS. 3 to 8.

In the operating device 40 configured as described above, for example, play (backlash, assembly error, and the like) exists in the rotation direction within the actuator 60, and play (backlash due to spline fitting) exists in the rotation direction in the coupling portion between the output shaft 63 of the actuator 60 and the spindle 52 of the detent plate 51, and therefore there are cases in which the target rotation angle of the electric motor 61 of the actuator 60 and the actual rotation angle of the detent plate 51 are different due to the accumulation of such play.

In view of this, in this embodiment, basically, at the time of changing the position of the detent plate 51, first the internal play of the actuator 60 is reduced, thus bringing about a state in which drive force can be directly transmitted from the rotor of the electric motor 61 to the output shaft 63, and thereafter the subsequent target rotation angle of the electric motor 61 is set with consideration given to the play of the coupling portion between the output shaft 63 and the spindle 52, thus rotationally driving the spindle 52 in a state in which the coupling play has been reduced.

In this way, the position of the detent plate 51 is changed after reducing all of the play that exists in the power transmission pathway from the electric motor 61 to the detent plate 51.

Figure 7:
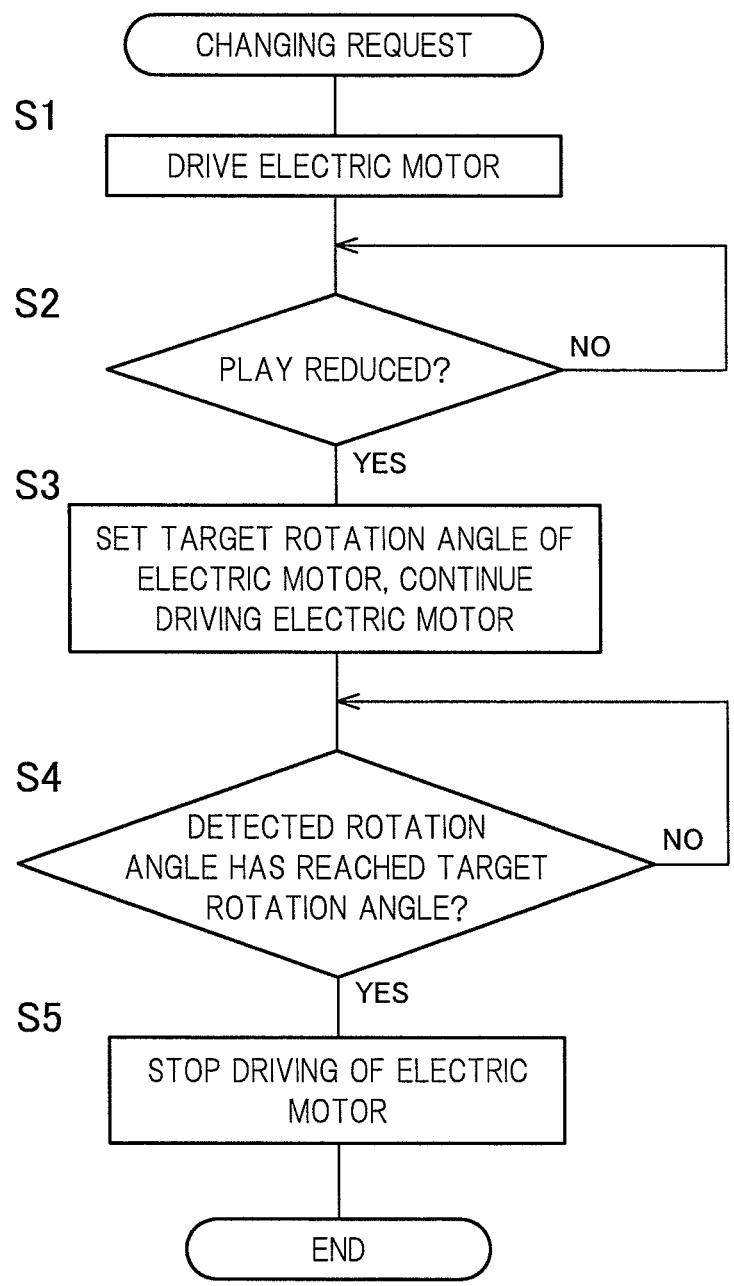
FIG. 7 is a flowchart used in a description of operations in the present invention.

The following is a specific description of procedures and operations performed when changing the position of the detent plate 51 with reference to the flowchart shown in FIG. 7.

The flowchart shown in FIG. 7 is processing performed by the ECU 5, and is started when, for example, any of the parking range (P), the reverse range (R), the neutral range (N), the drive range (D), and the like has been selected according to a selection operation performed by the driver with use of the shift lever 1, and furthermore a request for the range position change has been recognized based on a signal output from the range position sensor 4.

First, in step S1 the electric motor 61 of the actuator 60 is driven in a forward rotation or inverse rotation direction in order to change the position of the detent plate 51 to the position corresponding to the range position that was recognized based on the output signal from the range position sensor 4. Here, the target rotation angle of the electric motor 61 is not set.

Next, in step S2 a determination is made as to whether the internal play of the actuator 60 has been reduced.

Specifically, the period from when the electric motor 61 is driven until when the output shaft 63 rotates in step S1 is the period in which the internal play is being reduced, and when the output shaft 63 starts rotating, the internal play has been reduced, and drive force is being directly transmitted from the electric motor 61 to the output shaft 63.

Figure 4:
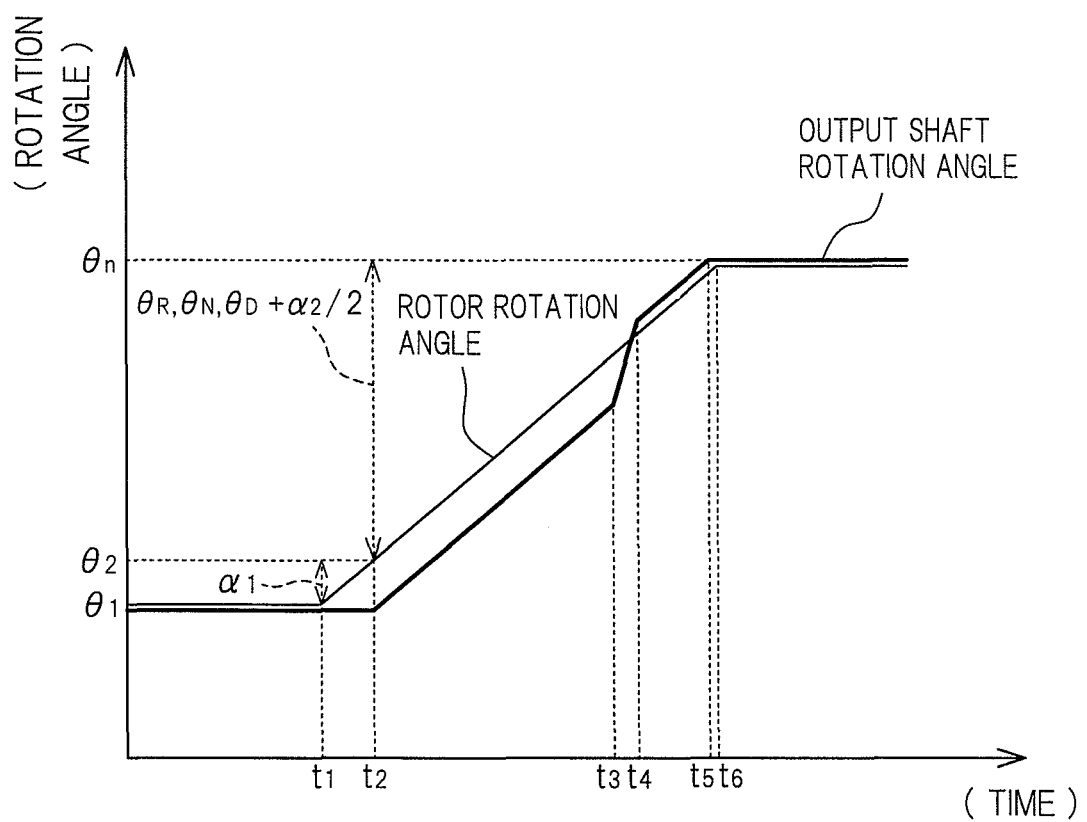
FIG. 4 is a graph showing changes in the rotation angle of a rotor of an electric motor and the rotation angle of the output shaft in the process in which the detent plate shown in FIG. 2 is tilted one range-worth.

Accordingly, the judgment regarding reduction of the internal play is an examination as to whether, after the start of rotation of the rotor of the electric motor 61 has been detected based on a detection signal from the rotor angle detection means 6, the start of rotation of the output shaft 63 of the actuator 60 has been detected based on a detection signal from the output angle detection means 7. For example, as shown in FIG. 4, the period necessary for reducing the internal play is from time t1 when the start of rotation of the rotor has been detected based on the output from the rotor angle detection means 6, until time t2 when the start of rotation of the output shaft 63 has been detected based on the output from the output angle detection means 7. Here, $\alpha 1$ is the rotation angle necessary for reducing the internal play.

Here, a negative determination is made in step S2 if the reduction of the internal play of the actuator 60 has not been completed, whereafter processing waits until the reduction of the internal play has been completed, an affirmative determination is made in step S2 when the reduction of the internal play has been completed, and processing moves to the next step S3.

In step S3, a target rotation angle θn (see FIG. 4) of the rotor of the electric motor 61 is set, and driving (electrification) of the electric motor 61 is continued.

Figure 8:
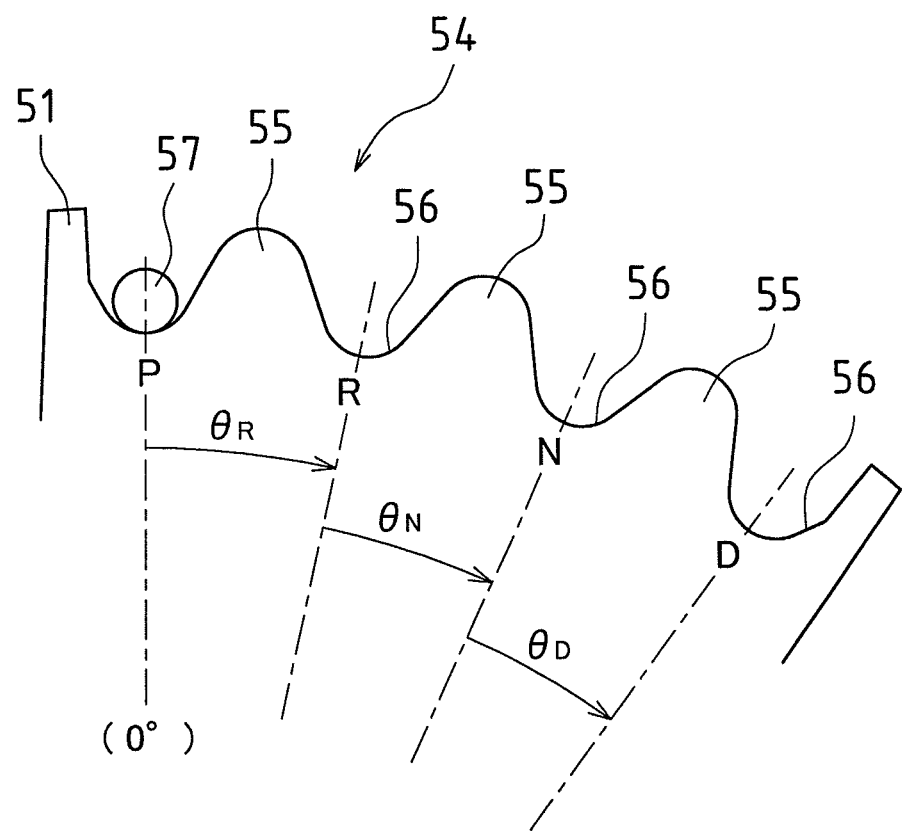
FIG. 8 is a diagram for describing a rotation angle necessary for changing the position of the detent plate in FIG. 2.

This target rotation angle θn is set to, for example, a value obtained by multiplying a rotation angle $\alpha 2$ corresponding to an average value of play in the rotation direction that exists in the coupling portion between the output shaft 63 and the spindle 52 by ½, and tacking on the result to the rotation angle necessary for changing the position of the detent plate 51 to the position corresponding to the shift range change request (see θR, θN, and θD in FIG. 8). This tacked on value is assumed to be stored in the ECU 5 in advance as a fixed value.

Note that although the tacked on value is a value obtained by multiplying the rotation angle $\alpha 2$ corresponding to the average value of play in the rotation direction that exists in the coupling portion by ½, the present invention is not limited to this, and it is possible to tack on, for example, ½ the design maximum value of the coupling play, or tack on a value obtained by multiplication by an arbitrary value other than ½.

For reference, the following describes the superiority of the case in which the tacked on value is ½ the rotation angle $\alpha 2$ corresponding to the average value of the coupling play. In the first place, the coupling play is individually different due to manufacturing tolerance and the like, and there is difference between the maximum value and minimum value of the manufacturing tolerance. In view of this, in the case in which the actual measured value of the coupling play is the maximum value of the manufacturing tolerance or the minimum value of the manufacturing tolerance, if the tacked on value is ½ the rotation angle $\alpha 2$ corresponding to each individual average value of coupling play, it can be said that error with respect to individual difference is smaller.

Thereafter, in step S4 a determination is made as to whether the output (detected rotation angle) from the rotor angle detection means 6 has reached the target rotation angle θn.

Here, a negative determination is made in step S4 before the detected rotation angle reaches the target rotation angle θn, and continues to be made until such angle has been reached, and when such angle has been reached, an affirmative determination is made in step S4, and processing moves to the next step S5. In step S5, the driving (electrification) of the electric motor is stopped, and the processing of this flowchart ends.

As is clear from the above description of operations, the initial motion means described in claim 1 corresponds to step S1, and the management means described in claim 1 corresponds to steps S2 to S5.

It should be noted that although a phenomenon in which the detent plate 51 propels itself occurs in the period in which drive force is being transmitted from the electric motor 61 to the output shaft 63, there is no significant negative influence on the positioning of the detent plate 51.

Note that although conventionally known, the self-propulsion phenomenon is described below with reference to FIGS. 4 to 6.

For example, in the processing of tilting the detent plate 51 one range-worth from the parking range P position to the reverse range R, drive force is not transmitted from the electric motor 61 to the spindle 52 in the period up to when the total play (see a in FIGS. 5 and 6) obtained by adding the coupling play to the internal play of the actuator 60 has been reduced (see the period from times t1 to t2 in FIG. 4).

Figure 5:
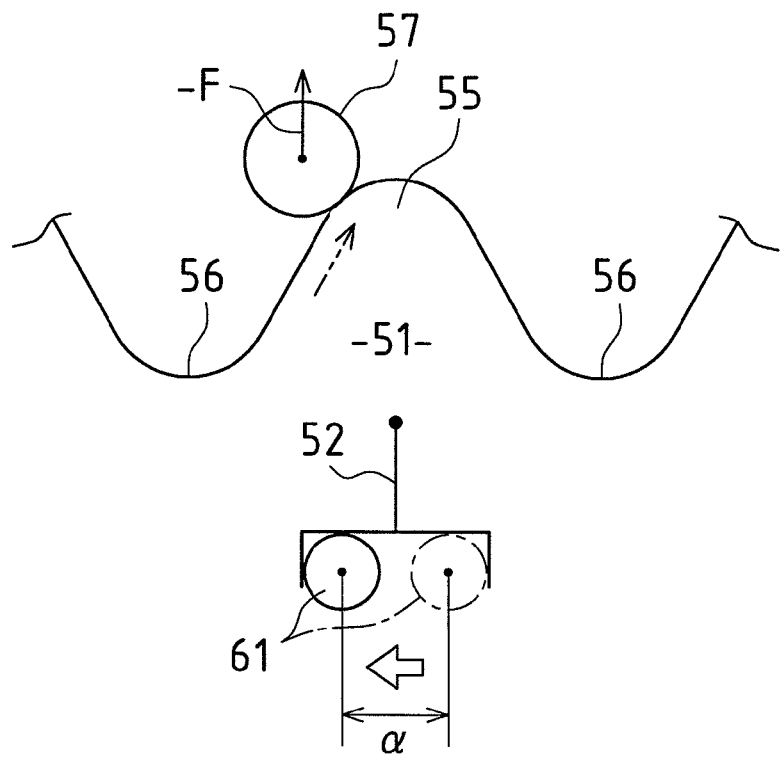
FIG. 5 is a diagram for describing a condition when a roller of a detent spring is rising in the tilting process of the detent plate in FIG. 2.

When the total play a has been reduced and the drive force of the electric motor 61 is transmitted to the spindle 52, as shown in FIG. 5, the roller 57 of the detent spring 53 begins to rise from a valley 56 to a mountain 55 of the wave part 54 of the detent plate 51. In this rising process, the roller 57 is pushed in the −F direction in FIG. 5, the detent spring 53 elastically deforms, and elastic restorative force is accumulated.

Figure 6:
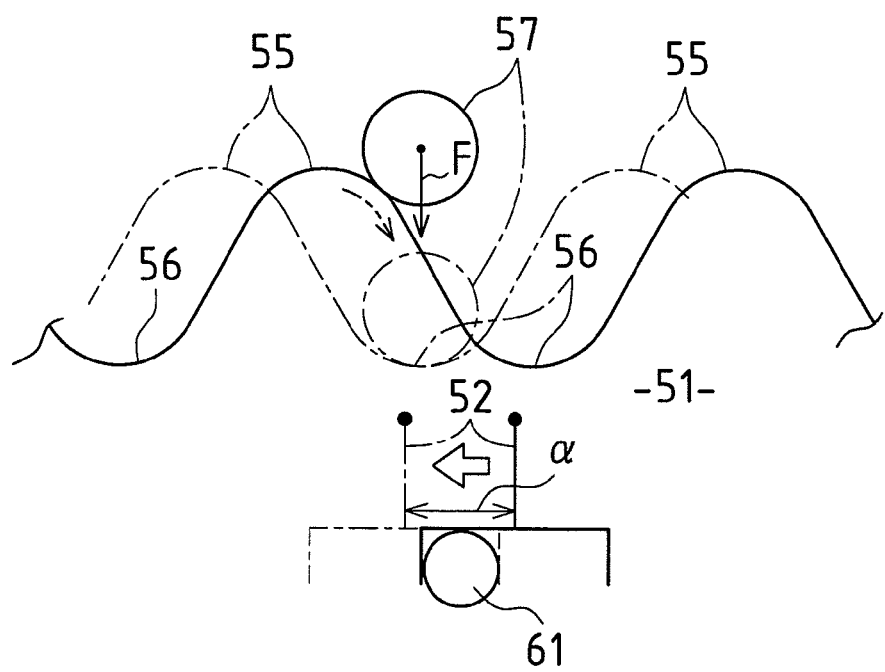
FIG. 6 is a diagram for describing a condition when a roller of a detent spring is descending in the tilting process of the detent plate in FIG. 2.

Thereafter, as shown in FIG. 6, when the roller 57 passes over the mountain 55 of the wave part 54 and begins to engage with the valley 56 that is the target, the roller 57 is pressed into the valley side due to the accumulated elastic restorative force F of the detent spring 53. Due to the load from the roller 57, the detent plate 51 is pushed forward in the tilt direction, from the solid line to the dashed-dotted line as shown in FIG. 6 (this corresponds to the period from times t3 to t4 in FIG. 4). During such period, the drive force of the electric motor 61 is not being transmitted to the detent plate 51, and therefore the reduced total play a increases again, and the roller 57 slides down the valley 56 that is the target (from times t4 to t5 in FIG. 4). Due to this sliding, the change in the rotation angle of the output shaft 63 occurs before the change in the rotation angle of the rotor of the electric motor 61. This phenomenon is called "self-propulsion" of the detent plate 51.

Finally, at time t6 in FIG. 4, the rotor of the electric motor 61 reaches the target rotation angle and the driving of the electric motor 61 stops, and when the roller 57 has reached the bottom of the valley 56 that is the target, the rotor of the electric motor 61 catches up to the rotation of the output shaft 63, and the amount of play generated by the self-propulsion is reduced.

Note that although the roller 57 does not actually roll, since the relative positions of the roller 57 and the detent plate 51 change, the expression that the roller 57 rolls is used in the above description, thus making the description easy to understand.

As described above, according to the present embodiment to which features of the present invention have been applied, it is possible to precisely change the position of the detent plate 51 while keeping the control content simple compared to learning the internal play of the actuator 60 and setting the target rotation angle with consideration given to such learned result as in the conventional example.

Figure 9:
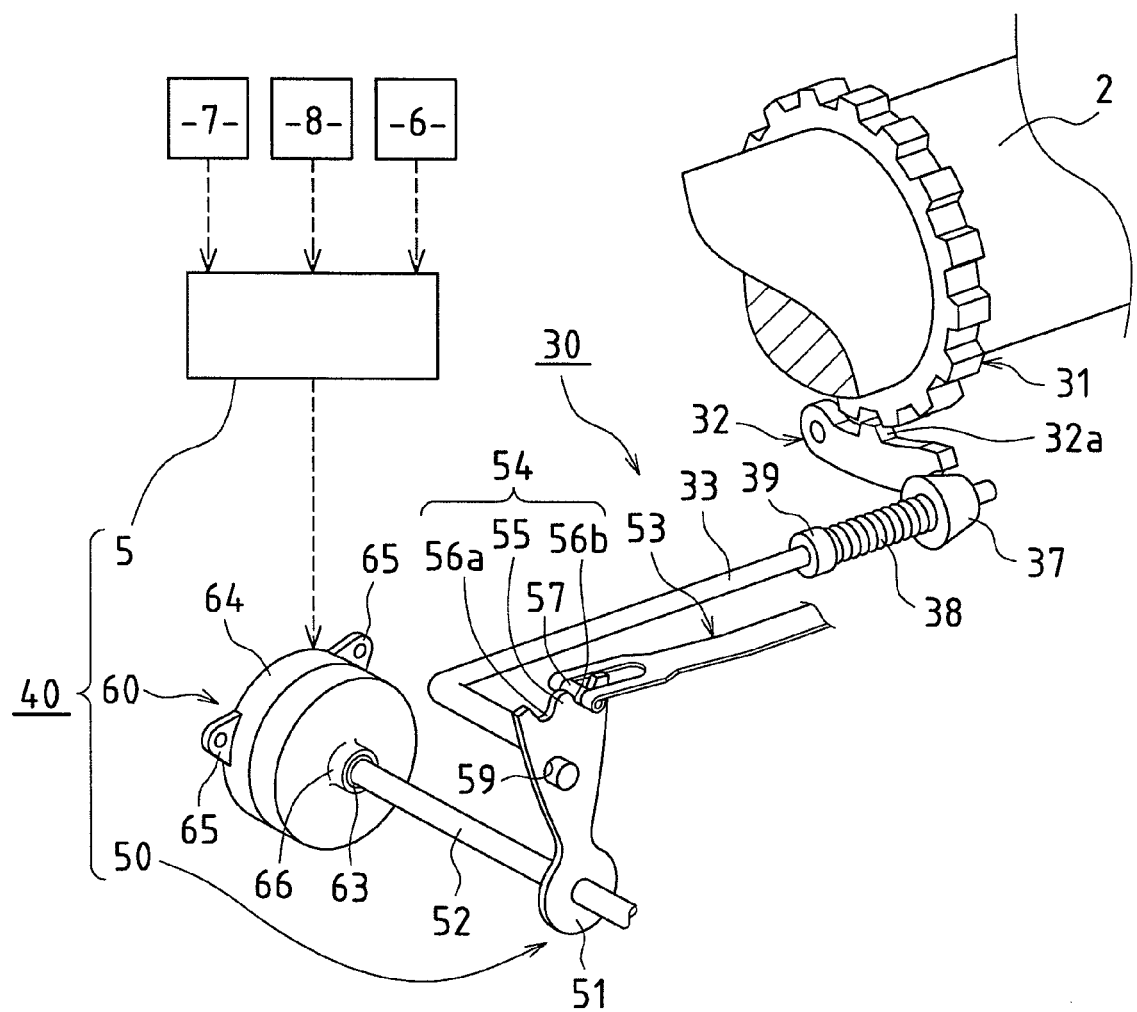
FIG. 9 is a perspective view showing a schematic configuration of an embodiment of a parking apparatus according to the present invention.
Figure 10:
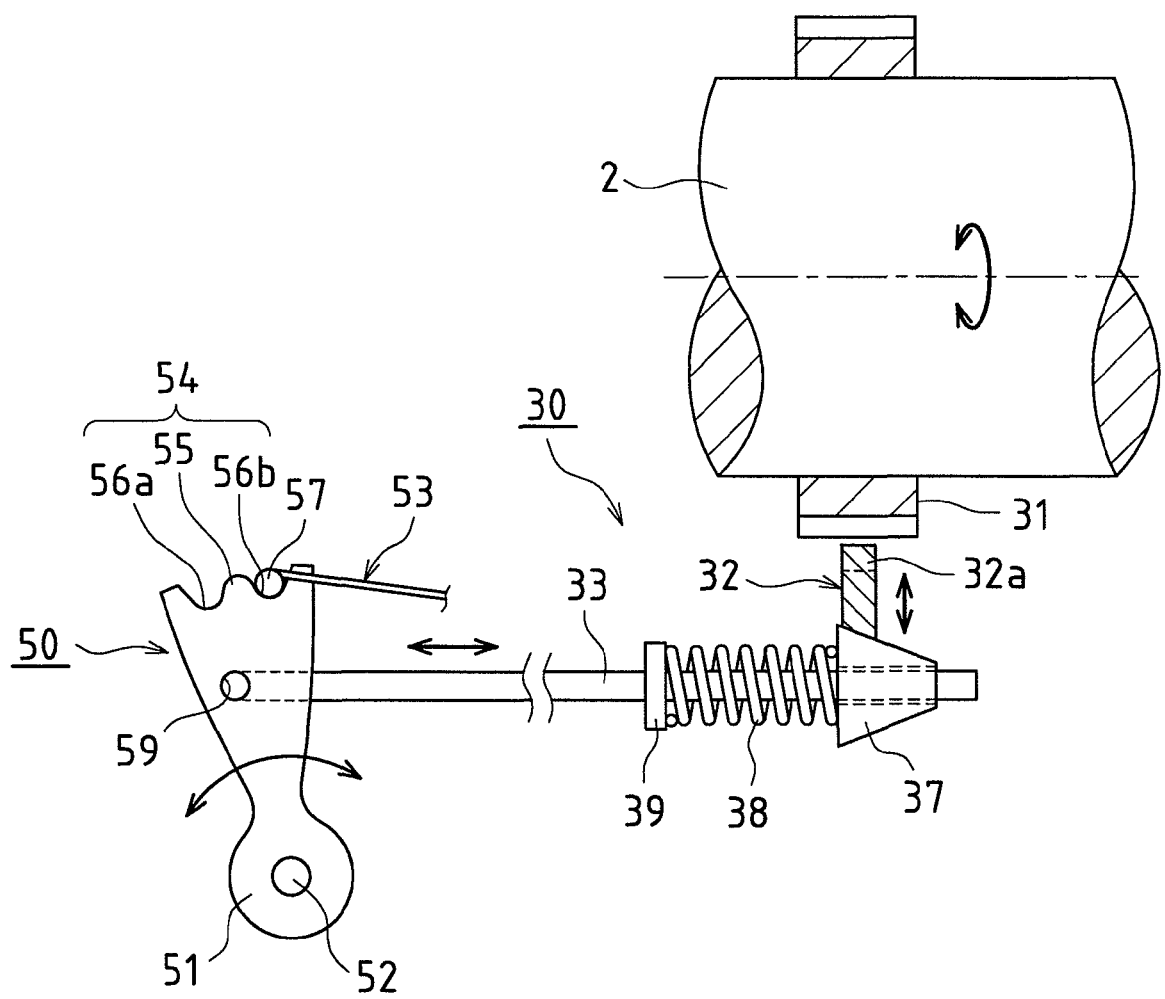
FIG. 10 is a side view of the parking apparatus in FIG. 9, and shows an unlocked state.
Figure 11:
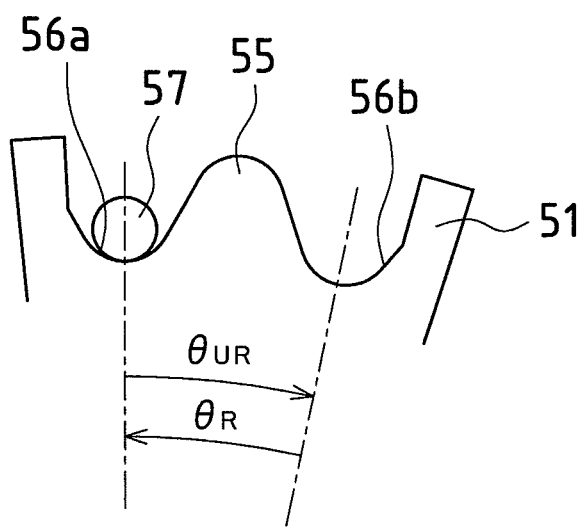
FIG. 11 is a diagram for describing a rotation angle necessary for changing the position of the detent plate in an operating device of the parking apparatus in FIG. 9.

Next is a detailed description of an embodiment of the parking apparatus 30 according to the present invention with reference to FIGS. 9 to 11.

The parking apparatus 30 of this embodiment basically has a configuration in which the manual valve 20 for range changing in the automatic transmission in the above-described range changing device 10 has been excluded, and the number of valleys 56 of the wave part 54 for positioning that is provided in the detent plate 51 has been reduced to two.

The main configuration of the parking apparatus 30 is the same as described above, and the parking apparatus 30 has a configuration including the parking gear 31, the parking lock pole 32, the parking rod 33, and the operating device 40 (the detent mechanism 50, the actuator 60, and the ECU 5).

The operating device 40 of the parking apparatus 30 is electrically controlled by the ECU 5 in response to an operation performed on a parking operation member 8 such as a parking button.

Note that as shown, the wave part 54 of the detent plate 51 is provided with two valleys, namely a lock valley 56a and an unlock (parking cancellation) valley 56b, and one mountain 55 exists between these valleys 56a and 56b. Also, although not shown, the base end side of the detent spring 53 is attached to a fixing portion such as the automatic transmission case 3.

The following describes basic operations of such a parking apparatus 30.

First, if the driver performs an operation for selecting the parking lock with use of the parking operation member 8, a parking lock signal is input from the parking operation member 8 to the ECU 5. The ECU 5 drives the actuator 60 in response to the input of the parking lock signal, thus rotating the output shaft 63 and the spindle 52 by a predetermined angle in the lock direction, which is, for example, the forward rotation direction.

Accordingly, the detent plate 51 is tilted integrally with the spindle 52 in the same direction as previously described, and along with this, the parking rod 33 is pushed toward the rear end side. Then, the large diameter side of the taper cone 37 pushes the parking lock pole 32 upward, and the claw 32a thereof is inserted between the teeth of the parking gear 31. Accordingly, the output shaft 2 of the automatic transmission is put into the locked state in which rotation is not possible.

On the other hand, if the driver performs an operation for selecting parking cancellation with use of the parking operation member 8, a parking cancellation signal is input from the parking operation member 8 to the ECU 5. The ECU 5 drives the actuator 60 in response to the input of the parking cancellation signal, thus rotating the output shaft 63 and the spindle 52 by a predetermined angle in the unlock direction, which is, for example, the reverse rotation direction.

Accordingly, the detent plate 51 is tilted integrally with the spindle 52 in the same direction as described above, along with this, the parking rod 33 and the taper cone 37 are pulled toward the front end side, and the upward pushing force of the parking lock pole 32 due to the taper cone 37 is canceled, and therefore the parking lock pole 32 descends downward, and the claw 32a thereof becomes free from between the teeth of the parking gear 31. Accordingly, the output shaft 2 of the automatic transmission is put into the unlocked state in which rotation is possible.

Note that when the previously described locked state or unlocked state is established, the roller 57 of the detent spring 53 engages with one of the two valleys 56 in the wave part 54 of the detent plate 51, and the position of the detent plate 51 is thus positioned and maintained.

Even with the operating device 40 of the parking apparatus 30 described above, the position of the detent plate 51 is changed by performing control likewise to that of the operating device 40 of the above-described range changing device 10.

In other words, the processing in the flowchart shown in FIG. 7 can basically be used for control regarding state changing in the operating device 40 of the parking apparatus 30 as well. In view of this, descriptions that are redundant with the above embodiment have been omitted, and only differing matter will be described in detail.

As shown in FIG. 11, in the parking apparatus 30, letting θUR be the rotation angle necessary in the case of switching from the state in which the lock (parking range) valley 56a of the detent plate 51 is caused to be engaged with the roller 57 of the detent spring 53 to the state of being engaged with the unlock (non-parking range) valley 56b, and letting θR be the rotation angle necessary for the opposite switching, these rotation angles θUR and θR are used at the time of setting the target rotation angle in step S3 of FIG. 7.

Actions and effects likewise to those of the range changing device 10 can be obtained in the above-described parking apparatus 30 as well.

The following are examples of other embodiments of the present invention.

(1) The range changing device 10 and the parking apparatus 30 described in the above embodiments are used incorporated in a front-engine rear-drive (FR), front-engine front-drive (FF), or other type of automatic transmission. Also, the automatic transmission is not limited to a stepped system or a stepless system. Furthermore, there is no limitation to an automatic transmission, and incorporation in a manual transmission that does not employ a torque converter is also possible.

(2) Although the shape of the wave part 54 of the detent plate 51 is a sine curve in the above embodiments in order to simply the description, there are no particular limitations on such shape. Although not show, the present invention is applicable even in the case in which, for example, the shape of the valleys is not bilaterally symmetrical, with the bottom being the center.

(3) In the above embodiments, the form is adopted in which, in the case of changing the position of the detent plate 51, first the internal play of the actuator 60 is reduced, and thereafter the target rotation angle of the electric motor 61 is appropriately set. However, as another embodiment of the present invention, a form is possible in which, in the case of changing the position of the detent plate 51, first the target rotation angle of the electric motor 61 is set, the driving of the electric motor 61 is started, and then after the reduction of the internal play has ended, the target rotation angle is corrected.

Figure 12:
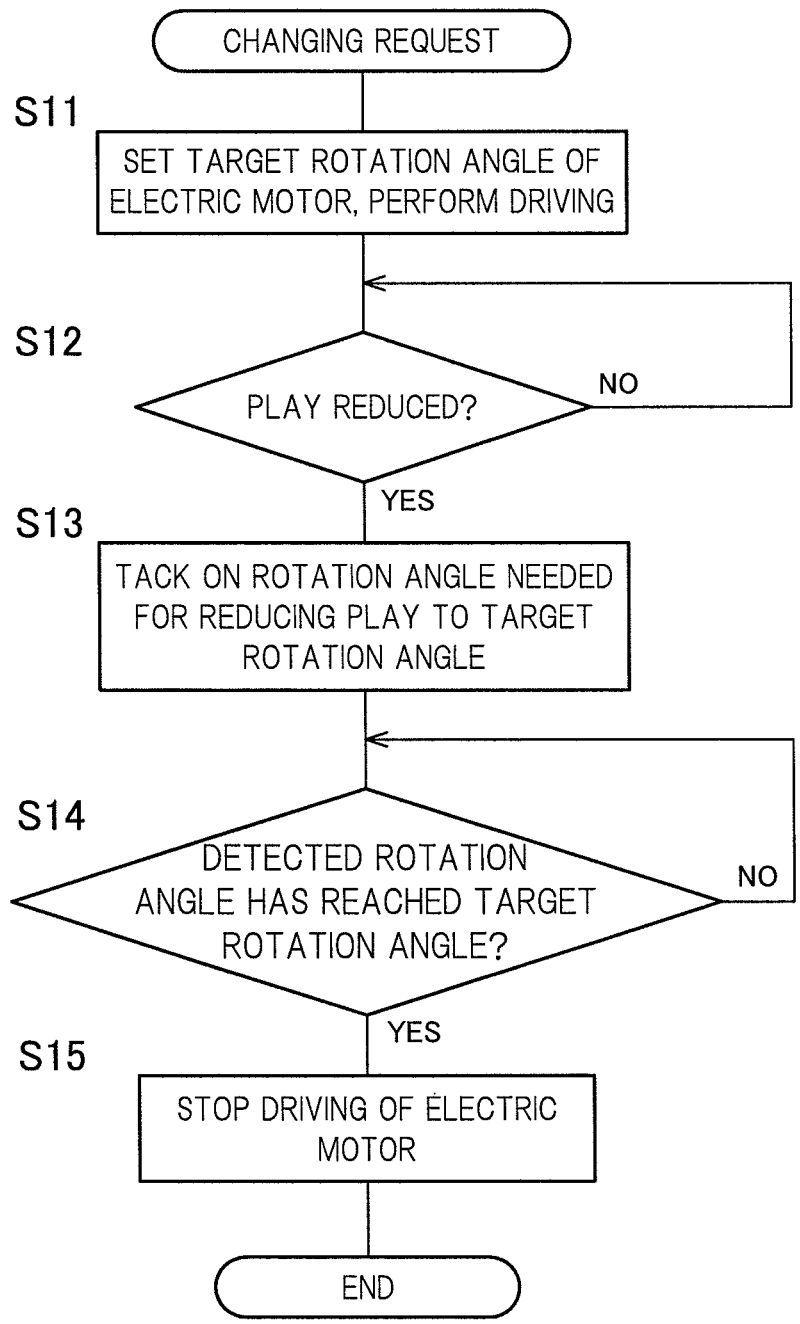
FIG. 12 is a flowchart used in a description of operations in another embodiment of the range changing device according to the present invention.

The following describes this form with reference to the flowchart in FIG. 12. The flowchart shown in FIG. 12 is processing performed by the ECU 5, and is started when, for example, any of the parking range (P), the reverse range (R), the neutral range (N), the drive range (D), and the like has been selected along with a selection operation performed by the driver on the shift lever 1, and furthermore a request for the range position change has been recognized based on a signal output from the range position sensor 4.

First, in step S11 the target rotation angle of the rotor of the electric motor 61 is set and the electric motor 61 is driven (electrified) in order to change the position of the detent plate 51 to the position corresponding to the range position recognized based on the output signal from the range position sensor 4.

This target rotation angle is set to, for example, a value obtained by multiplying a rotation angle α2 corresponding to an average value of play in the rotation direction that exists in the coupling portion between the output shaft 63 and the spindle 52 by ½, and tacking on the result to the rotation angle necessary for changing the position of the detent plate 51 to the position corresponding to the shift range change request (see θR, θN, and θD in FIG. 8). This tacked on value is assumed to be stored in the ECU 5 in advance as a fixed value.

Note that although the tacked on value is a value obtained by multiplying the rotation angle α2 corresponding to the average value of play in the rotation direction that exists in the coupling portion by ½, the present invention is not limited to this, and it is possible to tack on, for example, ½ the design maximum value of the coupling play, or tack on a value obtained by multiplication by an arbitrary value other than ½.

The following describes the superiority of the case in which the tacked on value is ½ the rotation angle α2 corresponding to the average value of the coupling play. In the first place, the coupling play is individually different due to manufacturing tolerance and the like, and there is difference between the maximum value and minimum value of the manufacturing tolerance. In view of this, in the case in which the actual measured value of the coupling play is the maximum value of the manufacturing tolerance or the minimum value of the manufacturing tolerance, if the tacked on value is ½ the rotation angle α2 corresponding to each individual average value of coupling play, it can be said that error with respect to individual difference is smaller.

Next, in step S12 a determination is made as to whether the internal play of the actuator 60 has been reduced.

Specifically, the period from when the electric motor 61 is driven until when the output shaft 63 rotates in step S11 is the period in which the internal play is being reduced, and when the output shaft 63 starts rotating, the internal play has been reduced, and drive force is being directly transmitted from the electric motor 61 to the output shaft 63.

Accordingly, the judgment regarding reduction of the internal play is an examination as to whether, after the start of rotation of the rotor of the electric motor 61 has been detected based on a detection signal from the rotor angle detection means 6, the start of rotation of the output shaft 63 of the actuator 60 has been detected based on a detection signal from the output angle detection means 7. Here, α1 is the rotation angle necessary for reducing the internal play.

Here, a negative determination is made in step S12 if the reduction of the internal play of the actuator 60 has not been completed, whereafter processing waits until the reduction of the internal play has been completed, an affirmative determination is made in step S12 when the reduction of the internal play has been completed, and processing moves to the next step S13.

In step S13, the target rotation value set in step S11 is corrected. Here, the correction is performed by tacking on the rotation angle α1 necessary for reducing of the internal play to the target rotation angle set in step S11.

Thereafter, in step S14 a determination is made as to whether the output (detected rotation angle) from the rotor angle detection means 6 has reached the target rotation angle.

Here, a negative determination is made in step S14 before the detected rotation angle reaches the target rotation angle, and continues to be made until such angle has been reached, and when such angle has been reached, an affirmative determination is made in step S14, and processing moves to the next step S15. In step S15, the driving (electrification) of the electric motor is stopped, and the processing of this flowchart ends.

As described above, in this embodiment, basically the internal play is reduced by driving the electric motor 61 by an anticipated target rotation angle, and thereafter the rotation angle necessary for reducing the internal play is tacked on to the anticipated target rotation angle. Accordingly, likewise to the above embodiments, the position of the detent plate 51 can be precisely changed with relatively simple control content.

(4) In the above embodiments, examples have been given in which the operating device 40 of the shift changing device 10 and the parking apparatus 30 have a configuration including the output angle detection means 7 that detects the rotation angle of the output shaft 63 of the actuator 60, but a configuration is possible in which a detent angle detection means that detects the rotation angle of the spindle 52 of the detent plate 51 or the detent plate 51 itself is included instead of the output angle detection means 7.

In this case, the rotor angle detection means 6 detects the rotation angle of the rotor of the electric motor 61, the detent angle detection means detects the rotation angle of the spindle 52 of the detent plate 51, and the difference between such rotation angles is obtained, thereby enabling recognizing the total play in the power transmission pathway from the electric motor 61 to the detent plate 51 (the sum of the play existing within the actuator 60 and the play existing in the coupling portion between the output shaft 63 and the spindle 52 due to spline fitting).

Technical ideas disclosed in the embodiment shown in FIGS. 1 to 8 can be applied to the operating device 40 employing such detent detection means. Such embodiments correspond to exemplary embodiments of claim 2. Although the flowchart shown in FIG. 7 can be applied in this case, the meaning of the content described in some of the steps is different.

Specifically, first, in step S2 of FIG. 7 it is sufficient to make a determination as to whether the total play has been reduced based on output from the detent angle detection means. Also, it is sufficient for the target rotation angle set in step S3 of FIG. 7 to be, for example, only the rotation angle necessary for changing the position of the detent plate 51 to the position corresponding to the shift range change request (see θR, θN, and θD in FIG. 8).

In this case, it is possible to precisely change the position of the detent plate 51 by an even simpler technique than that in the above embodiments.

Additionally, technical ideas disclosed in the embodiment shown in the above section (3) can be applied to the operating device 40 employing the above-described detent detection means. Although the flowchart shown in FIG. 12 can be applied in this case, the meaning of the content described in some of the steps is different.

Specifically, first, it is sufficient for the target rotation angle set in step S11 of FIG. 12 to be, for example, only the rotation angle necessary for changing the position of the detent plate 51 to the position corresponding to the shift range change request (see θR, θN, and θD in FIG. 8). Also, in step S12 of FIG. 12 it is sufficient to make a determination as to whether the total play has been reduced based on output from the detent angle detection means. Furthermore, in step S13 of FIG. 12, it is sufficient to tack on the rotation angle necessary for reducing the total play to the target rotation angle.

In this case, it is possible to precisely change the position of the detent plate 51 by an even simpler technique than that in the above embodiments.

The present invention can be implemented in various other forms without departing from the spirit or principal features of the present invention. The embodiment described above is therefore nothing more than illustrative in every respect, and should not be interpreted in a limiting way. The scope of the present invention is defined by the scope of the claims, and should not be restricted to the foregoing description in any way. Furthermore, all variations and modifications within a scope equivalent to the scope of the claims are encompassed in the scope of the present invention.

INDUSTRIAL APPLICABILITY

The present invention enables, for example, precisely positioning a detent member by changing it to a target position with a relatively simple technique, and can contribute to an improvement in operation stability, and moreover is advantageous in terms of enabling the simplification of control content, and along with this, suppressing or preventing an elevation in the cost of designing control programs and the like. The effects of the automatic transmission range changing device and parking apparatus according to the present invention are very useful.

REFERENCE SIGNS LIST

1 shift lever (shift operation means)
2 output shaft of automatic transmission
4 shift position sensor (range detection means)
5 electronic control unit
6 rotor angle detection means
7 output angle detection means
10 range changing device (state-changing element)
20 manual valve
22 spool of manual valve (displacement member)
30 parking apparatus (state-changing element)
31 parking gear
32 parking lock pole
32a claw of parking lock pole
33 parking rod (displacement member)
40 operating device
50 detent mechanism
51 detent plate (detent member)
52 spindle of detent plate
53 detent spring (positioning member)
54 wave part of detent plate
55 mountain of wave part
56 valley of wave part
57 roller of detent spring (engaging part)
60 actuator
61 electric motor of actuator
62 deceleration mechanism of actuator
63 output shaft of actuator
64 case of actuator

The invention claimed is:

1. An operating device for a state-changing element whose state changes by being mechanically displaced, comprising:
    a detent mechanism for displacing and positioning a displacement member included in the state-changing element,
    an actuator for driving the detent mechanism,
    an output angle detection means detecting a rotation angle of an output shaft of the actuator, and
    a control unit that controls the actuator,
    the detent mechanism including a detent member that displaces the displacement member by being tilted by the actuator, and a positioning member that maintains a resting position of the detent member,
    the actuator including an electric motor that generates rotational power, the output shaft that is coupled coaxially with a spindle of the detent member and so as to be capable of integral rotation, and a deceleration mechanism that decelerates the rotational power generated by the electric motor, and outputs the decelerated rotational power from the output shaft,
    the control unit including an initial motion means that, in a case of receiving a request to change the state of the state-changing element and changing the position of the detent member, reduces play in the rotation direction that exists in a coupling portion between the spindle and the output shaft from after driving of the electric motor until the output shaft rotates, and
    a management means that, when it has been determined that the play has been reduced at a time of detecting the start of rotation of the output shaft by the output angle detection means, sets a value obtained by tacking on play in the rotation direction that exists in a coupling portion between the spindle and the output shaft to a spindle rotation angle necessary for a position change of the detent member corresponding to the request, as a target rotation angle of the electric motor after it has been determined that the play has been reduced.

2. An operating device for a state-changing element whose state changes by being mechanically displaced, comprising:
    a detent mechanism for displacing and positioning a displacement member included in the state-changing element,
    an actuator for driving the detent mechanism,
    a detent angle detection means detecting a rotation angle of a spindle or a detent member, and
    a control unit that controls the actuator, the detent mechanism including the detent member that displaces the displacement member by being tilted by the actuator, and a positioning member that maintains a resting position of the detent member, the actuator including an electric motor that generates rotational power, an output shaft that is coupled coaxially with a spindle of the detent member and so as to be capable of integral rotation, and a deceleration mechanism that decelerates the rotational power generated by the electric motor, and outputs the decelerated rotational power from the output shaft, and the control unit including an initial motion means that, in a case of receiving a request to change the state of the state-changing element and changing the position of the detent member, reduces a total of play in the rotation direction from after driving of the electric motor until the output shaft rotates and play in the rotation direction in a coupling part from the output shaft to the detent member, and a management means that, when it has been determined that the total of the play has been reduced at a time of detecting the start of rotation of the spindle or the detent member by the detent angle detection means, sets a spindle rotation angle necessary for a position change of the detent member corresponding to the request, as a target rotation angle after it has been determined that the play has been reduced, and drives the electric motor.

3. The operating device for the state-changing element according to claim 1, wherein the management means determines, based on output from a rotor angle detection means that detects a rotation angle of a rotor of the electric motor, whether the detected rotation angle of the rotor has reached the target rotation angle, and stops the driving of the electric motor when it has been determined that the target rotation angle has been reached.

4. The operating device for the state-changing element according to claim 1, wherein the detent member has a wave part formed from a plurality of valleys that correspond to each rotation angle of the detent member and a mountain between the valleys, and the positioning member has an engaging part that is engaged with any of the valleys of the wave part on a free end side of the positioning member, and a spindle rotation angle necessary for a position change of the detent member is an angle from the bottom of a valley to the bottom of another valley of the detent member.

5. A range changing device for an automatic transmission, comprising;

a shift operation means for selecting a shift range;

a range detection means that detects a position of a shift range that has been selected by the shift operation means; and an operating device for changing the state of a manual valve that is a constituent element of a hydraulic control device for shift range changing included in the automatic transmission, based on detection output from the range detection means, the operating device having the configuration according claim 1.

6. A parking apparatus comprising:

a parking gear externally fixed to an output shaft of a transmission;

a parking lock pole that has a claw able to be locked to the parking gear, and furthermore is displaced to a lock position at which rotation is made impossible by approaching the parking gear and causing the claw to be locked with the parking gear, and an unlock position at which rotation is made possible by separating from the parking gear and detaching the claw from the parking gear;

a parking rod capable of being pushed or pulled so that the parking lock pole is displaced closer or farther with respect to the parking gear; and an operating device capable of pushing or pulling the parking rod, and the operating device have the configuration according to claim 1.

* * * * *